United States Patent [19]

Young et al.

[11] Patent Number: 4,833,179

[45] Date of Patent: May 23, 1989

[54] SUSPENSION POLYMERIZATION

[75] Inventors: Chung I. Young, Roseville; Rudyard M. Enanoza, Woodbury, both of Minn.

[73] Assignee: Minnesota Mining and Manufacturing Company, St. Paul, Minn.

[21] Appl. No.: 104,092

[22] Filed: Oct. 2, 1987

Related U.S. Application Data

[63] Continuation-in-part of Ser. No. 78,209, Jul. 27, 1987, abandoned.

[51] Int. Cl.$^4$ ............................................. C08F 220/10
[52] U.S. Cl. ................................ 522/183; 526/328.5; 526/260; 526/194; 526/212; 526/264; 526/318.4; 526/240; 525/260
[58] Field of Search ...................... 526/328.5, 260, 194, 526/212, 264, 318.4, 240; 522/183; 525/260

[56] References Cited

U.S. PATENT DOCUMENTS

| | | | |
|---|---|---|---|
| Re. 24,906 | 12/1960 | Ulrich | 206/59 |
| 3,691,140 | 9/1972 | Silver | 260/78.5 |
| 3,786,116 | 1/1974 | Milkovich et al. | 260/885 |
| 4,551,388 | 11/1985 | Schlademan | 428/355 |
| 4,554,324 | 11/1985 | Husman et al. | 525/301 |

FOREIGN PATENT DOCUMENTS

| | | |
|---|---|---|
| 2455133 | 3/1982 | Fed. Rep. of Germany . |
| 57-42778 | 3/1982 | Japan . |

OTHER PUBLICATIONS

"Solvents", *Paint Testing Manual,* 13th Ed., G. G. Sward, editor (1972).
"A Three-Dimensional Approach to Solubility", *Journal of Paint Technology,* vol. 38, No. 496, pp. 269–280.

*Primary Examiner*—Joseph L. Schofer
*Assistant Examiner*—N. Sarofim
*Attorney, Agent, or Firm*—Donald M. Sell; Walter N. Kirn; Darla P. Neaveill

[57] ABSTRACT

The present invention relates to a method for suspension polymerization of a pressure-sensitive acrylate copolymer bead having a glass transition temperature of 0° C. or less. The method comprises making a monomer premix comprising an acrylic acid ester of non-tertiary alcohol, the alcohol having from 1 to 14 carbon atoms, with the average number of carbon atoms being about 4 to about 12, a polar monomer copolymerizable with the acrylic acid ester, a chain transfer agent, a free-radical initiator, and a modifier moiety selected from the group consisting of 2-polystyrylethyl methacrylate macromolecular monomers, reactive zinc salts and hydrophobic silicas. The premix is then combined with a water phase containing a sufficient amount of suspending agent to form a suspension. The suspension is concurrently agitated and polymerization of the polymer premix is permitted until polymer beads are formed. The polymer beads are then collected. The amount of the modifier moiety must be sufficient to render the copolymer bead non-agglomerating at room temperature and safely handleable and transportable.

17 Claims, No Drawings

1

SUSPENSION POLYMERIZATION

RELATED APPLICATIONS

This application is a continuation-in-part application of U.S. Ser. No. 78,209, filed July 27, 1987 now abandoned.

TECHNICAL FIELD

The present invention relates to a novel method for aqueous suspension polymerization of acrylate copolymer beads, and to the copolymer beads and adhesives made thereby.

BACKGROUND

The advantages of acrylic polymers as viscoelastic bases for pressure-sensitive adhesives are well known in the art. U.S. Patent RE 24,906 (Ulrich) cites many examples of these products. Initially, such compositions were made via solution polymerization. However, such methods of polymerization involved the use of large amounts of organic solvents. This was undesirable for both safety and economic reasons. Further, the necessity of an excess of such solvents in order to render the polymers transferable between containers drastically limited the handleability and transportability of the polymers.

Various methods of suspension or emulsion polymerization for copolymer pressure-sensitive adhesives have been disclosed in the art. Emulsion polymerization uses water as the medium, dissipates the exotherm due to the heat of polymerization, and is extremely safe. Further since the polymerization takes place within the micelle, the molecular weight is easily controlled, and the resulting emulsion is safer to handle However, the pressure-sensitive adhesives made via emulsions differed in performance properties and/or coatability from those made via solutions depending on the techniques employed, i.e., emulsion-formed adhesives frequently exhibited lessened adhesion.

U.S. Pat. No. 3,691,140 discloses pressure-sensitive adhesive microspheres having average diameters of from 5 micrometers to about 150 micrometers formed via emulsion polymerization. These microspheres are designed to maintain their beaded configuration when coated. This results in a porous coating rather than a continuous coating. Upon standing, the microspheres separate into two or more phases.

Suspension polymerization of pressure-sensitive adhesives has been attempted, but keeping the polar monomers such as acrylic acid in the organic phase long enough for polymerization with the alkyl acrylate monomers has been difficult. Japanese Laid-Open patent application No. 57-42778, published Mar. 10, 1982, discloses a pearl-shaped pressure-sensitive adhesive polymer obtained by suspension polymerization of optional methacrylic acid in alkyl acrylates and a specially formulated dispersing agent consisting of a copolymer made up of from 80–99.5% of a hydrophilic monomer and from 0.5–20% of a hydrophobic monomer. Conventional dispersing agents are disclosed to cause the resulting pearl-shaped polymers to block or agglomerate during polymerization. Furthermore, it is disclosed that even the specially formulated dispersing agents described may lower the adhesive properties of the copolymer German patent No. 24 55 133, published Mar. 4, 1982, discloses suspension polymerization of acrylate monomers into bead-shaped polymers. The polymer beads are coated with a crosslinking agent after polymerization to render them sensitive to radiation. No water-soluble polar monomers are used in the adhesives. The beads themselves need not even be tacky; low adhesion values are disclosed as is the addition of conventional tackifying agents.

U.S. Pat. No. 3,786,116 discloses use of macromolecular monomers (macromers) in water-based polymerization systems. No pressure-sensitive adhesive systems are disclosed.

U.S. Pat. No. 4,554,324 discloses hot melt pressure-sensitive adhesives formed by copolymerization of macromers alkyl acrylates to improve shear holding properties. Emulsion polymerization is disclosed, but not exemplified or preferred; all examples utilize solution polymerization.

U.S. Pat. No. 4,551,388 similarly incorporates from 1% to 30% methacrylate macromonomer by copolymerization.

U.S. patent application Ser. No. 895,323, filed Aug. 11, 1986, assigned to the assignee of the present application discloses solvent polymerization of pressure-sensitive adhesives comprising zinc carboxylates and methacrylate macromonomers.

SUMMARY OF THE INVENTION

The present invention relates to a method for suspension polymerization of a pressure-sensitive acrylate copolymer bead having a glass transition temperature of 0° C. or less, comprising the steps of:
(a) making a monomer premix comprising
  (i) acrylic acid ester of non-tertiary alcohol, said alcohol having from 1 to 14 carbon atoms, with the average number of carbon atoms being about 4 to about 12,
  (ii) a polar monomer copolymerizable with said acrylic acid ester,
  (iii) a chain transfer agent,
  (iv) a free-radical initiator, and
  (v) a modifier moiety;
(b) combining said premix with a water phase containing a suspending agent to form a suspension;
(c) concurrently agitating said suspension and permitting polymerization of said monomer premix until polymer beads are formed; and
(d) collecting said polymer beads, whereby the amount of said modifier moiety is sufficient to render wet copolymer beads non-agglomerating at room temperature to be safely handleable and transportable. The modified moiety is selected from the group consisting of polystyryl macromers, reactive zinc salts and hydrophobic silica. Certain zinc salts and the hydrophobic silica may be added after polymerization has begun, if desired.

Unless otherwise noted, all percentages, parts, and ratios herein are by weight.

DETAILED DESCRIPTION OF THE INVENTION

The alkyl acrylate monomers useful in the present invention are monofunctional unsaturated acrylate ester monomer. Included within this class of monomers are, for example, isooctyl acrylate, isononyl acrylate, 2-ethyl-hexyl acrylate, decyl acrylate, dodecyl acrylate, n-butyl acrylate and hexyl acrylate. Preferred monomers include isooctyl acrylate, isononyl acrylate, and butyl acrylate. Acrylate monomers comprise at least about 80 parts based on 100 parts total monomer content, preferably from about 85 parts to about 95 parts.

Polar monomers useful in the method of the invention include both moderately polar and strongly polar monomer 5. Polarity or hydrogen-bonding ability is frequently described by the use of terms such as "moderately", "strongly" and "poorly". References describing these and other solubility terms include "Solvents", *Paint Testing Manual*, 3rd Ed. Seward, G. G., Editor, American Society for Testing and Materials, Phila., Pa., 972, and "A Three-Dimensional Approach to Solubility", *Journal of Paint Technology*, Vol. 38, No. 496, pp. 269–280. Strongly polar monomers useful herein include acrylic acid, methacrylic acid, itaconic acid, hydroxyalkyl acrylates, styrene sulfonic acid or the sodium salt thereof, maleic acid, fumaric acid, citraconic acid, acrylamides, and substituted acrylamides. Moderately polar monomers useful herein include N-vinyl lactams such as N-vinyl pyrrolidone, N-vinyl caprolactam, acrylonitrile, dimethyl amino-propyl methacrylate, and vinyl chloride. Preferred polar monomers include acrylic acid, methacrylic acid, acrylamides and substituted acrylamides. Polar monomers comprise up to about 20 parts based on the total monomer content.

Modifier moieties useful in the method of the present invention include polystyryl methacrylate macromolecular monomers (macromers), zinc oxide or reactive zinc salts, and hydrophobic silica. Preferred moieties include the reactive zinc salts, and the macromers. A variety of useful macromers and methods for their preparation are disclosed in U.S. Pat. No. 3,786,116. A particularly useful 1-polystyrylethyl methacrylate macromonomer is commercially available under the name Chemlink 4500 TM. This macromer is a high glass transition temperature ($T_g$) polymeric material, having a $T_g$ of about 90° C. or higher, and a molecular weight of from about 5,000 to about 25,000. The modifier moiety is present in an amount ranging from about 0.05 to about 10 parts based on 100 parts total monomer content. The preferred level of modifier moiety varies with the selection of the moiety, i.e., a preferred level of macromer ranges from 0.5 to about 10 parts based on 100 parts monomer content. The macromer is added to the monomer premix. The reactive zinc salts and/or hydrophobic silica may be added to the monomer premix, alternatively, they may be added to the suspension during polymerization.

While not wishing to be bound by theory, several mechanisms have been postulated as follows: (1) the modifier moiety may act by orienting on the surface of the copolymer bead, thus forming an ionomeric network on the surface which increases the integrity of the bead to a degree that overcomes the natural tendency of the acrylate copolymer to agglomerate with other beads into large, difficult to handle masses; (2) the modifier may coat the surface to form a physical barrier to agglomeration; or (3) the modifier may enhance or stiffen the copolymer backbone, thus stiffening the copolymer beads. Surprisingly, the modification does not cause the copolymer bead to retain the beaded configuration upon coating. When the copolymer beads are processed, the beads are destroyed and the pressure-sensitive adhesive composition may be coated in a continuous film. Such film has good cohesive strength relative to its composition; that is, its cohesive strength is determined by the acrylate composition and is not reduced by the presence of the modifier moiety.

The copolymer beads of the invention are prepared by an aqueous suspension polymerization technique utilizing conventional suspension agents with optional anionic surfactants. The amount of surfactant is preferably from about 2.5 ppm to about 1.0 part based on 100 parts total monomer content. Preferred surfactants include sodium lauryl sulfate and sodium dioctyl sulfosuccinate. Non-ionic surfactants may also be included so long as an anionic surfactant is present and predominates.

Suspending agents are those conventionally used in suspension polymerization processes. They may be minimally water-soluble inorganic salts such as tribasic calcium phosphate, calcium carbonate, calcium sulfate, barium sulfate, barium phosphate, hydrophilic silicas, and magnesium carbonate. Preferred inorganic suspending agents include barium sulfate, hydrophilic silicas, and tribasic calcium phosphate. Water-soluble organic suspending agents may also be used, e.g., polyvinyl alcohol, poly-N-vinyl pyrrolidone, polyacrylic acid, polyacrylamide and hydroxyalkyl cellulose. The suspending agent is present in amounts ranging from about 0.01 part to about 5 parts based on 100 parts total monomer content.

Initiators for polymerizing the monomers to provide the copolymer beads of the invention are those which are normally suitable for free-radical polymerization of acrylate monomers and which are oil-soluble and have low solubility in water, e.g., organic peroxides such as benzoyl peroxide, lauryl peroxide and various thermal initiators. Preferred thermal initiators include 2,2'-azobisbutryronitrile, commercially available from E. I. duPont de Nemours under the trade Name Vazo TM 64. The initiator is present in an amount from about 0.05 to about 1 part based on 100 parts total monomer content.

Useful chain transfer agents include mercaptans, alcohols, and carbon tetrabromide. Isooctyl thioglycolate and carbon tetrabromide are preferred. The chain transfer agent is present in any amount of from about 0.01 to about 0.5 part based on 100 parts total monomer content.

Photocrosslinking agents may also be used in methods of the invention. Preferred crosslinking agents include copolymerizable aromatic ketone monomers, especially acryloxybenzophenone. When present, the photocrosslinker generally comprises from about 0.01 to about 5.0 parts based on 100 parts total monomer weight.

The monomers, modifier moiety, chain transfer agent, free-radical initiator, and any optional materials are mixed together in the prescribed ratio to form a monomer premix. They are then combined with a water phase comprising a suspending agent, any optional surfactant and water, and are polymerized with agitation for from about 2 to about 16 hours at a temperature of from about 40° C. to about 90° C. to give a suspension which contains the copolymer beads. The beads are then washed and separated from the water by means such as gravity filtration. The filtered product also generally comprises about 15-30% water.

Compositions made by the process of the invention may also contain one or more conventional additives. Preferred additives include tackifiers, plasticizers, pigments and dyes, extenders, fillers, antioxidants, stabilizers and multifunctional crosslinkers. An especially preferred additive is bis-vinyl ether. When present, this additive generally comprises from about 0.5 to about 1 part based on 100 parts total monomer content. Another preferred group of additives are those which will impart an electrostatic charge to the copolymer bead during polymerization, i.e., ammonia or tertiary amines. The introduction of an electrostatic charge facilitates the function of the modifier moiety.

The filtration products of the present invention, comprising the beads and water, are easily handleable, and easily and safely transportable. They are surprisingly free flowing, and do not agglomerate into unmanageable masses. They may be easily poured into tanks for transportation to distant manufacturing facilities. The beads are storagestable, and may be placed into storage tanks for long periods of time without undergoing physical or chemical degradation. Because the beads are stored wet rather than in organic solvents, they may be transported and stored without the elaborate safety and environmental procedures necessary when organic solvents are present. When dried, the polymers are inherently and permanently tacky.

Methods of Manufacture

Copolymer beads of the present invention are useful in any applications in which acrylate adhesives otherwise produced may be used. In order to make adhesive compositions, the copolymer beads may be coated from water or solvents or extruded. Such coating or extruding destroys the bead configuration and results in a continuous film of pressure-sensitive adhesive. These adhesive compositions may be applied to a backing or substrate using any conventional means such as roller coating, dip coating or extrusion coating. If the composition is to be used as a tape, it is coated onto a flexible carrier web; if it is to be used as a transfer film, it may be applied to a release liner such as a silicone-coated paper.

Test Methods

The test methods used in evaluation of various examples of the invention for determining peel adhesion and shear are those described by the American Society for Testing and Materials and in *Test Methods for Pressure-Sensitive Tapes,* Eighth Edition, August 1985, Pressure-Sensitive Tape Council, Glenview, Ill.

Peel Adhesion

ASTM P3330-78 PSTC-1 (11/75)

Peel adhesion is the force required to remove a coated flexible sheet material from a test panel measured at a specific angle and rate of removal. In the examples this force is expressed in Newtons per 100 mm (N/100 mm) width of coated sheet. The procedure follows:

1. A 12.5 mm width of the coated sheet is applied to the horizontal surface of a clean glass test plate with at least 12.7 lineal cm in firm contact. A hard rubber roller is used to apply the strip.

2. The free end of the coated strip is doubled back nearly touching itself, so the angle of removal will be 180°. The free end is attached to the adhesion tester scale.

3. The glass test plate is clamped in the jaws of the tensile testing machine which is capable of moving the plate away from the scale at a constant rate of 2.3 meters per minute.

4. The scale reading in Newtons is recorded as the tape is peeled from the glass surface. The data is recorded as the average value of the range of numbers observed during the test.

Shear Holding Strength

Reference: ASTM: D3654-78; PSTC-7

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive coated sheet material from a stainless steel test panel under stress of a constant, standard load.

The tests were conducted on adhesive coated strips applied to a stainless steel panel such that a 12.5 mm by 12.5 mm portion of each strip was in firm contact with the panel with one end portion of the tape being free. The panel with coated strip attached was held in a rack such that the panel forms an angle of 178° with the extended tape free end which is then tensioned by application of a force of one kilogram applied as a hanging weight from the free end of the coated strip. The 2° less than 180° is used to negate any peel forces thus insuring that only the shear forces are measured in an attempt to more accurately determine the holding power of the tape being tested. The time elapsed for each tape example to separate from the test panel is recorded as the shear strength.

The following examples are intended to be illustrative, and should not be construed as limiting the invention. The examples employ materials as follows:

| Abbreviation | Material |
| --- | --- |
| IOA | isooctyl acrylate |
| INA | isononyl acrylate |
| LAS | sodium lauryl sulfate |
| IOTG | isooctyl thioglycolate |
| MAC | polystyryl methacrylate |
| CAL | tribasic calcium phosphate |
| ABP | acryloxybenzophenone |
| ZnO | zinc oxide |
| NVP | N—vinyl pyrrolidone |
| AA | acrylic acid |
| MAA | methacrylic acid |
| PSA | pressure sensitive adhesive |

EXAMPLES

Example I

The reaction is carried out in a two liter split flask equipped with condenser, thermowell, nitrogen inlet, stainless steel, motor-driven agitator, and a heating mantle with temperature control. The reaction flask is first charged with 618 g of deionized water to which are added 6 g CAL, 0 50 g of 1% LAS water solution, and 67 g of NaCl. The reactor is heated to 55° C. and maintained at this temperature with agitation for 1 to 2 hours while purging with nitrogen until the calcium phosphate has been thoroughly coated with the surfactant. At this point a premixed charge of 372.4 g of IOA, 8.0 g of Chemlink TM 4500 polystyryl methacrylate (MAC) and 19.6 g of AA to which has been added 2 g of VA-ZO TM 64 initiator and 0.29 g of IOTG with mixing until solution has been completed. The resulting solution with initiator and chain transfer agent is then added to the initial aqueous mixture while vigorous agitation (700 rpm) is being maintained to obtain a good suspension. The reaction is continued with nitrogen purging for at least 10 hours, during which time it is monitored to prevent an exothermic reaction taking the reaction above 70° C. The PSA beads are then collected by using a Buchner funnel followed by several washings of deionized water. The filtration product also contained about 15 to 30% of water and was stable for storage, transportation, and handling for further processing. These beads were dried then dissolved in ethyl acetate solution and coated from solution to a dried thickness of 25 micrometers on a 37 micrometer polyester film. The coated film was tested for peel adhesion and shear strength. Results were 36 N/100 mm peel adhesion and 504 minutes for shear holding.

Example II

The reaction is carried out in two liter split flask equipped with condenser, thermowell, nitrogen inlet, stainless steel motor-driven agitator, and a heating mantle with temperature control. The reaction flask is first charged with 618 g of deionized water to which are added 6 g of CAL, 0.50 g of 1% LAS solution, and 67 g of NaCl. The reactor is heated to 55° C. and maintained at this temperature with agitation for 1 to 2 hours while purging with nitrogen until the CAL has been thoroughly coated with the surfactant. At this point a premixed charge of 376 g of IOA, and 24 g of AA to which has been added 2 g of VAZO TM 64 initiator, 0.28 g of ABP and 0.29 g of IOTG with mixing until solution has been completed. The resulting solution with initiator and chain transfer agent is then added to the initial aqueous mixture while vigorous agitation (700 rpm) is maintained to obtain a good suspension. The reaction is continued with nitrogen purging for a least 10 hours, during which time it is monitored to prevent an exothermic reaction taking the reaction temperature above 70° C. At this point, 30.9 g of 28.30% ammonium hydroxide is added followed by 4.12 g of zinc acetate. The reaction is continued with heating to 55° C. and maintaining nitrogen purge and agitation for 2 hours. The PSA beads are then collected by using a Buchner funnel and several washings of deionized water. The resulting filtration product also contained about 15 to 30% of water and was stable for storage, transportation and handling for further processing. The beads polymerized by this suspension technique were dried. The dried beads were extruded in solid form onto 37 micrometer primed polyester film at a coating thickness of 21 micrometers followed by exposure to ultraviolet radiation. The peel adhesion of the coated film was 66 N/100 mm and the shear holding time was 193 minutes. The ease of handling was not impaired by the photocrosslinking modification.

Example III

The reaction is carried out in two liter split flask equipped with condenser, thermowell, nitrogen inlet, stainless steel, motor-driven agitator, and a heating mantle with temperature control. The reaction flask is first charged with 618 g of deionized water to which are added 6 g of CAL, 0.50 g of 1% LAS solution, and 67 g of NaCl. The reactor is heated to 55° C. and maintained at this temperature with agitation for 1 to 2 hours while purging with nitrogen until the CAL has been thoroughly coated with the surfactant. At this point, a premixed charge of 376 g of IOA, and 32 g of to which has been added 2 g of VAZO TM 64 initiator and 0.29 g of IOTG with mixing until solution has been completed. The resulting solution with initiator and chain transfer agent is then added to the initial aqueous mixture while vigorous agitation (700 rpm) is maintained to obtain a good suspension. The reaction is continued with nitrogen purging for at least 10 hours during which time it is monitored to prevent an exothermic reaction taking the reaction temperature above 70° C. At this point, a 100 g of hydrophobic silica dispersion, which was made by dispersing 8 g of Aerosil ® R-972 in 92 g of water by Waring ® blender, was added. The reaction is continued with heating at 55° C. for another hour. The PSA beads are then collected by using a Buchner funnel followed by several washings of deionized water. The resulting filtration product also contained about 15 to 30% of water and was stable for storage, transportation and handling for further processing. These beads were dried, then dissolved in ethyl acetate solution and coated to a dried thickness of 24 micrometers onto a 37 micrometer polyester film. The coated film was tested for peel adhesion (55 N/100 mm) and shear holding time (70 minutes).

Example IV

The reaction is carried out in a two liter split flask equipped with condenser, thermowell, nitrogen inlet, stainless steel, motor-driven agitator, and a heating mantle with temperature control. The reaction flask is first charged with 618 g of deionized water to which are added 6 g of CAL, 0.50 g of 1% LAS solution, and 67 g of NaCl. The reactor is heated to 55° C. and maintained at this temperature with agitation for 1 to 2 hours while purging with nitrogen until the CAL has been thoroughly coated with the surfactant. At this point, a premixed charge of 362 g of IOA, 16 g of AA and 16 g of MAC to which has been added 2 g of VAZO TM 64 initiator and 0.29 g of IOTG with mixing until solution has been completed. The resulting solution with initiator and chain transfer agent is then added to the initial aqueous mixture while vigorous agitation (700 rpm) is being maintained to obtain a good suspension. The reaction is continued with nitrogen purging for at least 10 hours during which time it is monitored to prevent an exothermic reaction taking the reaction temperature above 70° C. At this point, 30.9 g of 28.30% ammonium hydroxide is added followed by 4.12 g of zinc acetate. The reaction is continued, heating at 55° C. and maintaining nitrogen purge and agitation for 2 hours. Then, a 100 g of hydrophobic silica dispersion, which was made by dispersing 8 g of Aerosil ® R-972 in 92 g of water by Waring ® blender, was added. The reaction is continued with heating at 55° C. for another hour. The PSA beads are then collected by using a Buchner funnel followed by several washings of deionized water. The resulting filtration product also contained about 15 to 30% of water and was stable for storage, transportation and handling for further processing. These beads were dried, and then extruded as a solid copolymer onto a 37 micrometer primed polyester film at a coating thickness of 24 micrometers. The coated film had a peel adhesion value of 37 N/100 mm and a shear holding time of 317 minutes.

Example V

The reaction is carried out in two liter split flask equipped with condenser, thermowell, nitrogen inlet, stainless steel, motor-driven agitator, and a heating mantle with temperature control. The reaction flask is first charged with 750 g of deionized water to which are added 1.5 g of ZnO and 0.75 g of hydrophilic silica Cab-O-Sil ™ EH-5 The reactor is heated to 55° C. while purging with nitrogen until the ZnO and EH-5 has been thoroughly dispersed. At this point, a premixed charge of 480 g of IOA, 20 g of MAA and 1 g of ABP to which has been added 2.5 g of VAZO ™ 64 initiator and 0.5 g of IOTG with mixing until solution has been completed. The resulting solution with initiator and chain transfer agent is then added to the initial aqueous mixture while vigorous agitation (700 rpm) is maintained to obtain a good suspension. The reaction is continued with nitrogen purging for at least 6 hours, during which time it is monitored to prevent an exothermic reaction taking the reaction temperature above 70° C. The PSA beads are then collected by using a Buchner funnel followed by several washings of deionized water. The resulting filtration product also contained about 15 to 30% of water and was stable for storage, transportation and handling for further processing. These beads were dried, dissolved in ethyl acetate, and coated to a dry thickness of 23 micrometers, subjected to ultraviolet radiation. The coated film was then tested for peel adhesion (57 N/100 mm) and shear time (1623 minutes).

Example VI

The reaction is carried out in two liter split flask equipped with condenser, thermowell, nitrogen inlet, stainless steel, motor-driven agitator, and a heating mantle with temperature control. The reaction flask is first charged with 750 g of deionized water to which are added 0.75 g of hydrophilic silicas, Cab-0-Sil ® EH-5 The reactor is heated to 55° C. while purging with nitrogen. At this point, a premixed charge of 480 g of IOA, 20 g of MAA, 1.0 g of zinc methacrylate and 0.50 g of ABP to which has been added 2.5 g of VAZO ® 64 initiator and 0.5 g of IOTG with mixing until solution has been completed. The resulting solution with initiator and chain transfer agent is then added to the initial aqueous mixture while vigorous agitation (700 rpm) is maintained to obtain a good suspension. The reaction is continued with nitrogen purging for at least 6 hours during which time it is monitored to prevent an exothermic reaction taking the reaction temperature above 70° C. The PSA beads are then collected by using a Buchner funnel followed by several washings of deionized water. The resulting filtration product also contained about 15 to 30% of water and was stable for storage, transportation and handling for further processing. These beads were dried, dissolved in ethyl acetate, coated to a dry thickness of 25 microns onto a 37 micron, primed polyester film, and exposed to ultraviolet radiation. The coated film was then tested for peel adhesion (60 N/100 mm) and for shear holding time (342 minutes).

Example VII

The reaction is carried out in two liter split flask equipped with condenser, thermowell, nitrogen inlet, stainless steel, motor-driven agitator, and a heating mantle with temperature control. The reaction flask is first charged with 750 g of deionized water to which are added 0.75 g of hydrophilic silica, Cab-O-Sil ® EH-5. The reactor is heated to 55° C. while purging with nitrogen. At this point, a premixed charge of 480 g of IOA, 20 g of MAA, 2 g of zinc diacrylate and 0.07 g of ABP to which has been added 2.5 g of VAZO ® 64 initiator and 0.5 g of IOTG with mixing until solution has been completed. The resulting solution with initiator and chain transfer agent is then added to the initial aqueous mixture while vigorous agitation (700 rpm) is maintained to obtain a good suspension. The reaction is continued with nitrogen purging for at least 6 hours during which time it is monitored to prevent an exothermic reaction taking the reaction temperature above 70° C. The PSA beads are then collected by using a Buchner funnel followed by several washings of deionized water. The resulting filtration product also contained about 15 to 30% of water and was stable for storage, transportation and handling for further processing. These beads were dried, then dissolved in ethyl acetate, coated to a dry thickness of 25 micrometers onto a 37 micrometer, primed polyester film, and exposed to ultraviolet radiation. The coated film was then tested for peel adhesion (68 N/100 mm) and shear holding time (14 minutes)

Example VIII

Same as Example II, except the monomer charges were: 368 g of IOA; 16 g of MAC; 16 g of AA; and ABP has been omitted. These beads were coated at a dry thickness of 28 micrometers onto a 37 micrometer primed polyester film. The coated film was then tested for peel adhesion (29 N/100 mm) and shear holding time (1600 minutes).

Example IX

The procedure of Example I except the monomer charges were: 352 g IOA; 12 g MAC; and 66 g of NvP. These beads were coated at a 25 micrometer thickness upon a 37 micrometer primed polyester film. The resulting film was then tested for peel adhesion (30 N/100 mm) and shear holding time (210 minutes).

Example X

This Example incorporates MAC into polymer beads by using the process as described in Example V, except by using monomer charge 368 g of IOA, 16 g of MAC, 16 g of MAA, 0.3 g of IOTG, and 4 g of ZnO in water phase. ABP is omitted in this Example. These beads were dried then extruded to a dry thickness of 25 micrometers onto a 37 micrometer primed polyester film. The coated film was then tested for peel adhesion (66 N/100 mm) and shear holding time (137 minutes).

Example XI

The reaction is carried out in a two-liter split flask equipped with condenser, thermowell, nitrogen inlet, stainless steel motor-driven agitator, and a temperature-controlled heater. The reaction flask is first charged with 489 g of deionized water, 1.7 g of 5% sodium dioctyl sulfosiccinate, 6.97 g of barium sulfate, and 80 g of NaCl. The reactor is heated to 55° C. and maintained at this temperature with agitation for 30 minutes while purging with nitrogen. To this mixture a premixed charge of 364 g of IOA, 20 g of AA, I6 g of Chemlink ® 4500 (MAC), 0.245 g of IOTG, and 1.6 g of VAZO ™ 64 initiator is added. The reaction is continued for 6 hours at 55-60° C. with nitrogen purge. To the resulting suspension 35 g of 30% ammonium hydroxide and 7 g of zinc octoate are added and the reaction continued for 55° C. for 3 more hours under nitrogen. The beads are collected by filtration and washed several times with deionized water. The filtration product which contains about 15 to 30 parts of water was found stable and showed no agglomeration or clustering of beads even after several freeze-thaw cycles. About half of the filtration product was dried and extrusion coated on 035 mm primed polyester film at 0.025 mm adhesive thickness to give tape samples with 44 N/100 mm of peel adhesion and 306 minutes of shear holding strength. The other portion of the filtration product was mixed with hydrophobic silica Aerosil® R972 (1 part by weight), then dried to give free-flowing dry beads which after extrusion coating on 0.035 mm primed polyester film at 0.025 mm adhesive thickness gave tape samples with 42 N/100 mm of peel adhesion and 270 minutes of shear holding strength.

Comparative Example XII

This Example is used to show that without using zinc oxide, the bead agglomerated during polymerization by using the process as described in Example II, except eliminating the use of ZnO. The suspension coagulated after reaction for one hour.

Comparative Example XIII

Same as Example III, except the IOTB charge was 0.5 g and the elimination of hydrophobic silica. The resulting PSA beads agglomerated in the storage jar within 8 hours.

TABLE I

| Example No. | Viscoelastic Base | | Modifiers/PBW | | | Comments on Beads |
|---|---|---|---|---|---|---|
| | Monomers | PBW | Zn | Si | Mac | |
| I | IOA/AA | 95/5 | None | None | 2.04 | free flow |
| II | IOA/AA | 94/6 | 1.03[1] | None | None | free flow |
| III | IOA/AA | 94/6 | None | 2.0[5] | None | free flow |
| IV | IOA/AA | 96/4 | 1.03[1] | 2.0[5] | 4.16 | free flow |
| V | IOA/MAA | 96/4 | 0.5[2] | None | None | free flow |
| VI | IOA/MAA | 95/5 | 1.0[3] | None | None | free flow |
| VII | IOA/MAA | 95/5 | 0.4[4] | None | None | free flow |
| VIII | IOA/AA | 96/4 | 1.03[1] | None | 4.16 | free flow |
| IX | IOA/NVP | 91/9 | None | None | 3.09 | free flow |
| X | IOA/MAA | 96/4 | 1.0[2] | None | 4.16 | free flow |
| XI | IOA/AA | 95/5 | 1.83[6] | 1.0 | 4.16 | free flow |
| *XII | IOA/MAA | 95/5 | None | None | None | Agglomeration during polymerization |
| *XIII | IOA/AA | 94/6 | None | None | None | Agglomeration during storage |

[1] Zinc Acetate
[2] Zinc Oxide (ZnO)
[3] Zinc Methacrylate (copolymerized)
[4] Zinc Diacrylate (copolymerized)
[5] Silica - "hydrophobic" - Aerosil ™ R-972
[6] Zinc Octoate
*Comparative Examples

What is claimed is:

1. A method for suspension polymerization of a pressure-sensitive acrylate copolymer bead having a glass transition temperature of 0° C. of less, comprising the steps of:
   (a) making a monomer premix comprising:
      (i) acrylic acid ester of non-tertiary alcohol, said alcohol having from 1 to 14 carbon atoms, with the average number I to 14 carbon atoms, with the average number of carbon atoms being from about 4 to about 12;
      (ii) a polar monomer copolymerizable with said acrylic acid ester;
      (iii) a chain transfer agent;
      (iv) a free-radical initiator; and
      (v) a modifier moiety;
   (b) combining said monomer premix with a water phase containing a suspending agent to form a suspension;
   (c) concurrently agitating said suspension and permitting polymerization of said monomer premix until copolymer beads are formed, and
   (d) collecting said copolymer beads,
   whereby said modifier moiety is present in an amount of from about 0.05 part to about 10 parts per 100 parts monomer premix.

2. The method of claim 1 wherein the modifier moiety is selected from the group consisting of macromolecular monomers, hydrophobic silicas, and reactive zinc salts.

3. The method of claim 2 wherein the modifier moiety is a macromolecular monomer.

4. A method according to claim 1 further comprising a photocrosslinker.

5. A method according to claim 4 wherein the photocrosslinker is acryloxybenzophenone.

6. The method of claim 1 wherein the monomer premix comprises:
   (a) from about 80 to about 95 parts of said acrylic acid ester of non-tertiary alcohol;
   (b) from about 5 to about 10 parts of said polar
   (c) from about 0.05 to about 10 parts of said modifier moiety;
   (d) from about 0.01 to about 1 part of said free radical initiator; and
   (e) from about 0.01 to about 0.3 part of said chain transfer agent.

7. A method according to claim 1 wherein the water phase comprises:
   (a) from about 0.01 to about 5 parts of said suspension agent;
   (b) from 0 to about 3 parts of a surfactant; and
   (c) water to 100 parts.

8. A method according to claim 1 comprising the steps of:
   (a) making a monomer premix consisting essentially of:
      (i) from about 80 to about 95 parts of an acrylic acid ester selected from the group consisting of isooctyl acrylate, dodecyl acrylate, isononyl acrylate, and butyl acrylate;
      (ii) from about 5 to about 20 parts of a polar copolymerizable monomer selected from the group consisting of acrylic acid, methacrylic acid, acrylamide, and N-vinyl pyrrolidone;

(iii) from about 0.01 to about 0.5 part of a chain transfer agent selected from the group consisting of mercaptans, alcohols, and carbon tetrabromide;

(iv) from 0.05 to 10 parts of a modifier moiety selected from the group consisting of 2-polystyrylethyl methacrylate macromolecular monomer, hydrophobic silica, zinc methacrylate, zinc acrylates, and zinc oxide; and (v) from about 0.01 to about 1 part 2,2'-azobisbutyronitrile;

(b) forming a suspension by combining said monomer premix with a water phase comprising:

(i) from about 0.01 to about 5 parts of a suspending agent;

(ii) from 0 to about 5000 ppm of a surfactant; and (iii) water;

(c) concurrently agitating said suspension and permitting polymerization of said monomer premix for at least 4 hours at from about 40° C. to about 75° C. to form copolymer beads; and (d) collecting said copolymer beads.

9. A method for suspension polymerization of a pressure-sensitive acrylate copolymer bead having a glass transition temperature of 0° C. of less, comprising the steps of:

(a) making monomer premix comprising:

(i) acrylic acid ester of non-tertiary alcohol said alcohol having from 1 to 14 carbon atoms, with the average number of carbon atoms being from about 4 to about 12;

(ii) a polar monomer copolymerizable with said acrylic acid ester;

(iii) a chain transfer agent;

(iv) a free-radical initiator;

(v) form about 0.05 to about 10 parts 2-polystyrylethyl methacrylate macromolecular monomer;

(b) combining said premix with a water phase containing a suspending agent to form a suspension;

(c) concurrently agitating and polymerizing said suspension until polymer beads begin to form;

(d) adding a basic compound to adjust pH to from 9 to (e) adding a modifier moiety selected from the group consisting of hydrophobic silica, zinc octoate, zinc acetate and mixtures thereof to said suspension and continuing agitation until polymer beads are coated; and (f) collecting said polymer beads.

10. A storage-stable, safely handleable and transportable pressure-sensitive copolymer bead made by the process of claim 1.

11. A storage-stable, safely handleable and transportable pressure-sensitive copolymer bead made by the process of claim 2.

12. A storage-stable, safely handleable and transportable pressure-sensitive copolymer bead made by the process of claim 6.

13. A storage-stable, safely handleable and transportable pressure-sensitive copolymer bead made by the process of claim 8.

14. A storage-stable, safely handleable and transportable pressure-sensitive copolymer bead made by the process of claim 9.

15. A free-flowing copolymer bead made by drying said copolymer beads of claim 9.

16. A sheet material comprising a pressure-sensitive acrylate adhesive made from the copolymer beads of claim 13.

17. A sheet material comprising a pressure-sensitive acrylate adhesive made from the copolymer beads of claim 14.

* * * * *

UNITED STATES PATENT AND TRADEMARK OFFICE
CERTIFICATE OF CORRECTION

PATENT NO. : 4,833,179
DATED : May 23, 1989
INVENTOR(S) : Young et al.

It is certified that error appears in the above-identified patent and that said Letters Patent is hereby corrected as shown below:

Col. 2, line 14, "macromers alkyl" should be --macromers in alkyl--.

Col. 2, line 24, "application discloses" should be --application, discloses--.

Col. 2, line 64, "monomer" should be --monomers--.

Col. 3, line 6, "monomer 5" should be --monomers--.

Col. 3, line 12, "972" should be --1972--.

Col. 11, line 2, "035" should be --0.035--.

Col. 11, line 22, "IOTB" should be --IOTG--.

Col. 11, line 58, "I" should be --1--.

Col. 12, line 22, "polar (c)" should be --polar copolymerizable monomer; (c)--.

Col. 9, line 36, "goof" should be --g of--.

Signed and Sealed this

Sixth Day of February, 1990

*Attest:*

JEFFREY M. SAMUELS

*Attesting Officer*     *Acting Commissioner of Patents and Trademarks*